United States Patent [19]

Scott

[11] Patent Number: 5,855,185
[45] Date of Patent: Jan. 5, 1999

[54] PET DISH

[76] Inventor: Charles H. Scott, 411 Bassetdale Ave., La Puente, Calif. 91746

[21] Appl. No.: 42,447

[22] Filed: Mar. 16, 1998

[51] Int. Cl.⁶ ........................................................ A01K 5/00
[52] U.S. Cl. .................................................................. 119/61
[58] Field of Search ............................ 119/61, 51.5, 52.1, 119/58, 60

[56] References Cited

U.S. PATENT DOCUMENTS 5,125,363  6/1992  McGaha ..................................... 119/61
5,277,149  1/1994  East ............................................. 119/61
5,467,738  11/1995  Cass ............................................ 119/61

*Primary Examiner*—Thomas Price

[57] ABSTRACT

A pet dish is provided including a food dish having a predetermined diameter for containing pet food therein. A base is included for containing water therein. The base has supports for supporting a periphery of a dish of any one of a plurality of diameters thereover in a fixed relation.

6 Claims, 2 Drawing Sheets

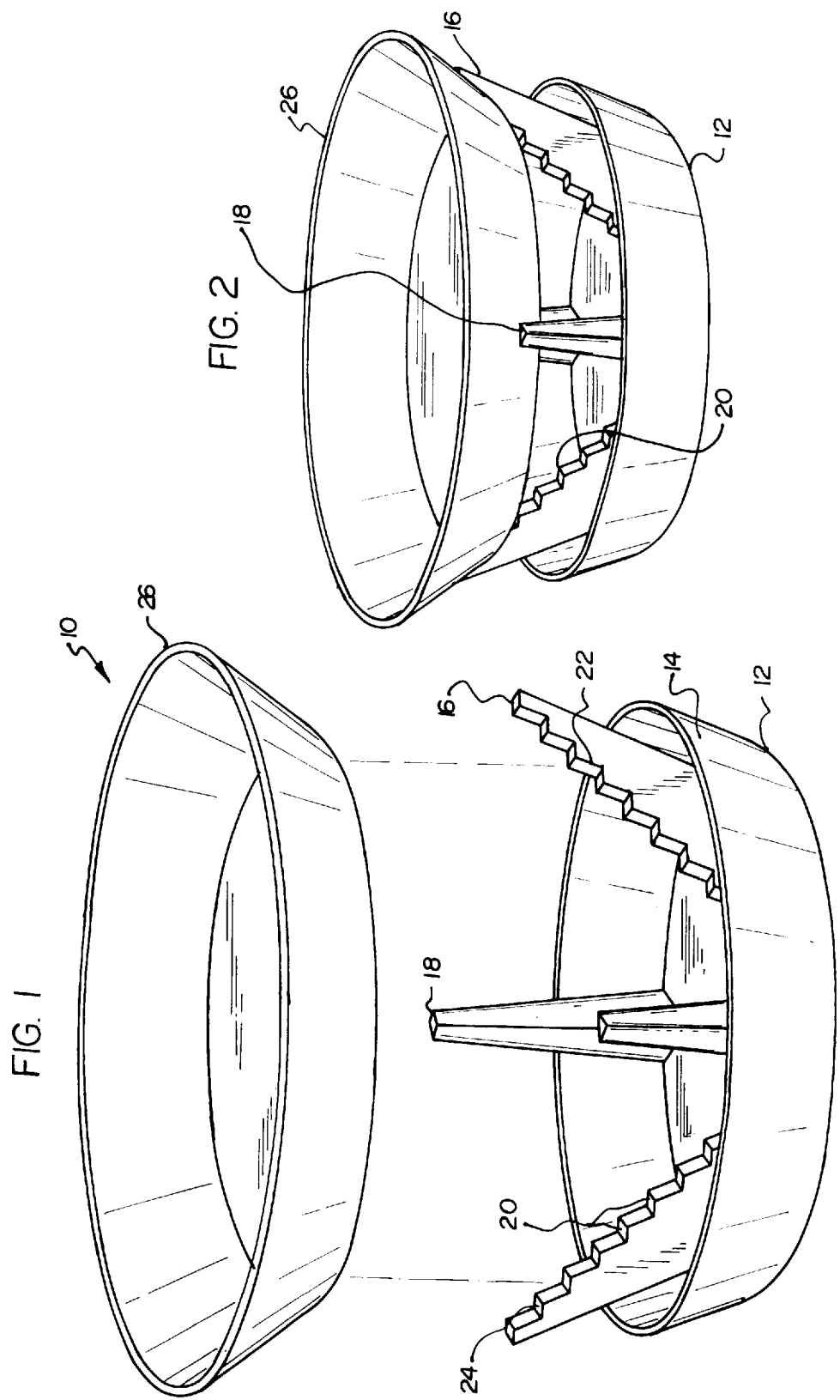

PET DISH

BACKGROUND OF THE INVENTION

1. Field of the Invention

The present invention relates to a pet dish and more particularly pertains to protecting pet food from ants and other insects.

2. Description of the Prior Art

The use of pet dish structures is known in the prior art. More specifically, pet dish structures heretofore devised and utilized for the purpose of preventing contamination of pet with insects are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,253,609; U.S. Pat. No. 4,981,108; U.S. Pat. No. 5,069,166; U.S. Pat. No. 5,031,575; U.S. Pat. No. 5,245,948; and U.S. Pat. Des. 314,454.

In this respect, the pet dish according to the present invention substantially departs from the conventional concepts and designs of the prior art, and in so doing provides an apparatus primarily developed for the purpose of protecting pet food from ants and other insects.

Therefore, it can be appreciated that there exists a continuing need for a new and improved pet dish which can be used for protecting pet food from ants and other insects. In this regard, the present invention substantially fulfills this need.

SUMMARY OF THE INVENTION

In view of the foregoing disadvantages inherent in the known types of pet dish structures now present in the prior art, the present invention provides an improved pet dish. As such, the general purpose of the present invention, which will be described subsequently in greater detail, is to provide a new and improved pet dish which has all the advantages of the prior art and none of the disadvantages.

To attain this, the present invention essentially comprises a base with a circular bottom having a top face, a bottom face, and a periphery formed therebetween. The base further includes a peripheral side wall with an inverted frusto-conical configuration integrally coupled to the periphery of the bottom and extending upwardly and outwardly therefrom. The base further has a first pair of diametrically opposed supports each having a frusto-pyramidal configuration. Such supports of the first pair are integrally coupled to the top face of the bottom a predetermined distance from the periphery of the bottom and extending vertically therefrom. A second pair of diametrically opposed supports are each integrally coupled to the top face of the bottom of the base a predetermined distance from the periphery of the bottom. Each of the second pair of supports has a slanted interior edge extending inwardly from a top to a bottom thereof. As shown in the Figures, the interior edge has a plurality of steps formed therein along a length thereof. Thus a plurality of horizontally oriented ledges are defined. Further, the base is filled with water during use. Lastly, a food dish is provided including a circular bottom having a top face, a bottom face, and a periphery formed therebetween. The food dish further includes a peripheral side wall with an inverted frusto-conical configuration integrally coupled to the periphery of the bottom and extending upwardly and outwardly therefrom for containing food therein. In operation, the bottom face of the food dish is removably situated on a pair of the ledges corresponding to a diameter of the food dish. Further, the side walls abut the first pair of stanchions for precluding the dish from being dismounted from atop the base.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet dish which has all the advantages of the prior art pet dish structures and none of the disadvantages.

It is another object of the present invention to provide a new and improved pet dish which may be easily and efficiently manufactured and marketed.

It is a further object of the present invention to provide a new and improved pet dish which is of a durable and reliable construction.

An even further object of the present invention is to provide a new and improved pet dish which is susceptible of a low cost of manufacture with regard to both materials and labor, and which accordingly is then susceptible of low prices of sale to the consuming public, thereby making such pet dish economically available to the buying public.

Still yet another object of the present invention is to provide a new and improved pet dish which provides in the apparatuses and methods of the prior art some of the advantages thereof, while simultaneously overcoming some of the disadvantages normally associated therewith.

Still another object of the present invention is to protect pet food from ants and other insects.

Lastly, it is an object of the present invention to provide a new and improved food dish having a predetermined diameter for containing pet food therein. A base is included for containing water therein. The base has supports for supporting a periphery of a dish of any one of a plurality of diameters thereover in a fixed relation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the pet dish constructed in accordance with the principles of the present invention.

FIG. 2 is a perspective illustration of the food dish mounted on the base.

Similar reference characters refer to similar parts throughout the several views of the drawings.

DESCRIPTION OF THE PREFERRED EMBODIMENT

Figure 3:
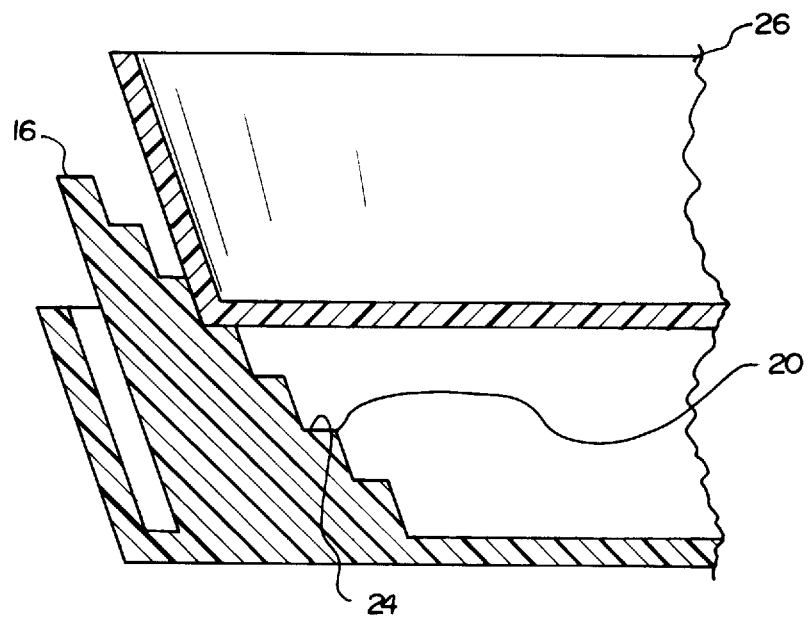
FIG. 3 is a cross-sectional view of one of the stanchions of the first pair.
Figure 4:
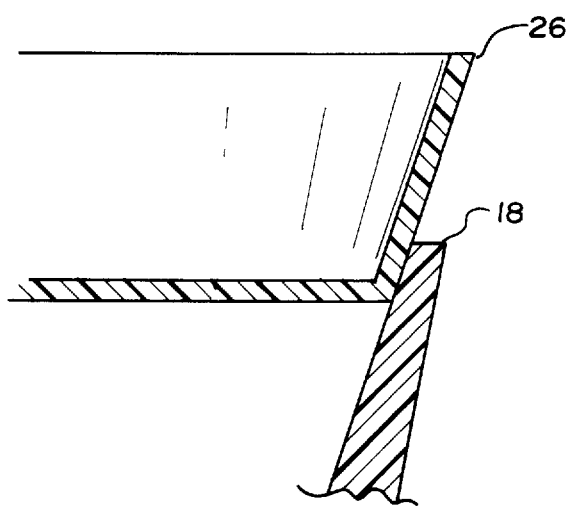
FIG. 4 is a cross-sectional view of one of the stanchions of the second pair.

With reference now to the drawings, and in particular to FIG. 1 thereof, a new and improved pet dish embodying the principles and concepts of the present invention and generally designated by the reference numeral 10 will be described.

The present invention, the new and improved pet dish, is comprised of a plurality of components. Such components in their broadest context include a base with a plurality of supports and a food dish. Such components are individually configured and correlated with respect to each other so as to attain the desired objective.

More specifically, it will be noted that the system 10 of the present invention includes a base 12 with a circular bottom having a top face, a bottom face, and a periphery formed therebetween. The base further includes a peripheral side wall 14 with an inverted frusto-conical configuration integrally coupled to the periphery of the bottom and extending upwardly and outwardly therefrom.

The base further has a first pair of diametrically opposed supports 16 each having a frusto-pyramidal configuration. Such supports of the first pair are integrally coupled to the top face of the bottom a predetermined distance from the periphery of the bottom and extend vertically therefrom. As shown in the Figures, the pyramid has planar side faces and a height which is at least 50% greater than that of the peripheral side wall of the base.

A second pair of diametrically opposed supports 18 are each integrally coupled to the top face of the bottom of the base a predetermined distance from the periphery of the bottom. Such spacing is similar to that associated with the first pair of supports and is preferably about 1 and ½ inches. In the preferred embodiment, the second pair of supports is at least 25% greater than the peripheral side wall of base. Further, the second pair of diametrically opposed supports are preferably spaced 90 degrees with respect to the first pair of supports. Each of the second pair of supports has a slanted interior edge 20 extending inwardly from a top to a bottom thereof. Associated therewith is an outer edge which is angled such that it resides in parallel with the peripheral edge of the base. Note FIG. 3. As shown, the inner edge has a lesser slope associated therewith as opposed to the outer edge. As shown in the Figures, the interior edge has a plurality of steps 22 formed therein along a length thereof. Thus a plurality of horizontally oriented ledges 24 are defined. Further, it should be noted that the base is filled with water during use.

Lastly, a food dish 26 is provided including a circular bottom having a top face, a bottom face, and a periphery formed therebetween. The food dish further includes a peripheral side wall with an inverted frusto-conical configuration integrally coupled to the periphery of the bottom and extending upwardly and outwardly therefrom for containing food therein. In operation, the bottom face of the food dish is removably situated on a pair of the ledges corresponding to a diameter of the food dish. Further, the side walls abut the first pair of stanchions for precluding the dish from being dismounted from atop the base.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pet dish comprising, in combination:

a base including a circular bottom having a top face, a bottom face, and a periphery formed therebetween, the base further including a peripheral side wall with an inverted frusto-conical configuration integrally coupled to the periphery of the bottom and extending upwardly and outwardly therefrom, the base further including a first pair of diametrically opposed supports having a frusto-pyramidal configuration integrally coupled to the top face of the bottom a predetermined distance from the periphery of the bottom and extending vertically therefrom and a second pair of diametrically opposed supports each integrally coupled to the top face of the bottom a predetermined distance from the periphery of the bottom, each of the second pair of supports having a slanted interior edge extending inwardly from a top to a bottom thereof and having a plurality of steps formed therein along a length thereof thereby defining a plurality of horizontally oriented ledges, wherein the base is filled with water; and a food dish including a circular bottom having a top face, a bottom face, and a periphery formed therebetween, the food dish further including a peripheral side wall with an inverted frusto-conical configuration integrally coupled to the periphery of the dish bottom face and extending upwardly and outwardly therefrom for containing food therein, wherein the bottom face of the food dish is removably situated on a pair of the ledges corresponding to a diameter of the food dish and further wherein the side wall abut the first pair of stanchions for precluding the dish from being dismounted from atop the base.

2. A pet dish comprising:

a food dish having a predetermined diameter for containing pet food therein; and a base for containing water therein, the base having stanchion means for supporting an outer periphery of a dish of any one of a plurality of diameters thereover in a fixed relation.

3. A pet dish as set forth in claim 2 wherein the stanchion means includes a plurality of ledges.

4. A pet dish as set forth in claim 2 wherein the stanchion means includes at least one stepped edge and at least one smooth edge.

5. A pet dish as set forth in claim 2 wherein the stanchion means is spaced inwardly from a periphery of the food dish.

6. A pet dish as set forth in claim 2 wherein the stanchion means includes a beveled interior edge.

\* \* \* \* \*